May 31, 1927.

W. A. ENGLAND 1,630,695

MIXING FAUCET

Filed Dec. 8, 1924

INVENTOR
William A. England
BY
White Prost & Evans
his ATTORNEYS

Patented May 31, 1927.

1,630,695

UNITED STATES PATENT OFFICE.

WILLIAM A. ENGLAND, OF SAN FRANCISCO, CALIFORNIA.

MIXING FAUCET.

Application filed December 8, 1924. Serial No. 754,557.

My invention relates to faucets and especially to faucets for mixing and delivering two fluids, such as syrup and water, and one of the objects of my invention is the provision of a faucet of simple construction which thoroughly mixes the fluids as they pass through it.

The invention possesses other objects and features of advantage, some of which, with the foregoing, will be set forth in the following description of the preferred form of my invention which is illustrated in the drawings accompanying, and forming part of the specification. It is to be understood that I do not limit myself to the showing made by the said drawings and description, as I may adopt variations of the preferred form within the scope of my invention as set forth in the claims.

Referring to the drawings.

Figure 1:
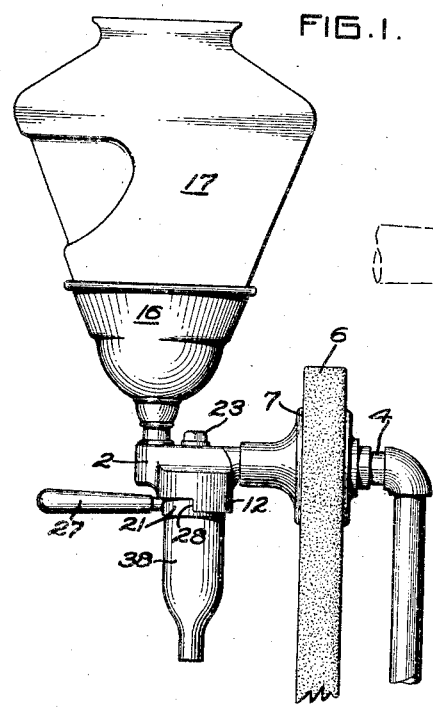
Figure 1 is a side elevation of my faucet, showing the same mounted upon a panel.
Figure 2:
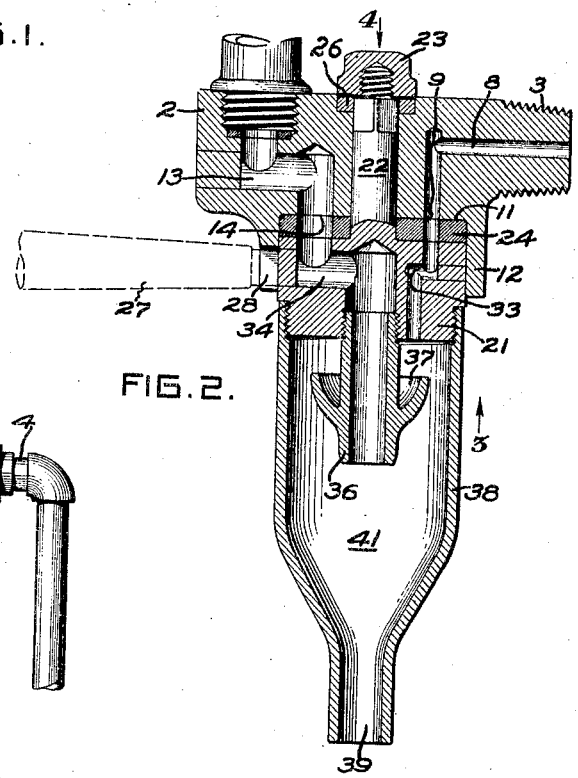
Figure 2 is a vertical sectional view of the faucet mechanism.
Figure 3:
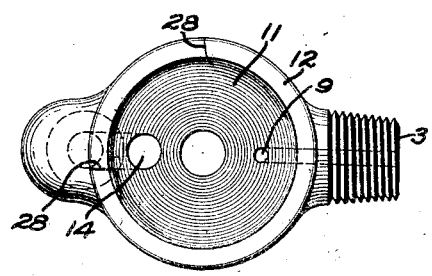
Figure 3 is a plan view of the face of the valve seat, the direction in which it is taken, being indicated by the arrow 3 of Figure 2.
Figure 4:
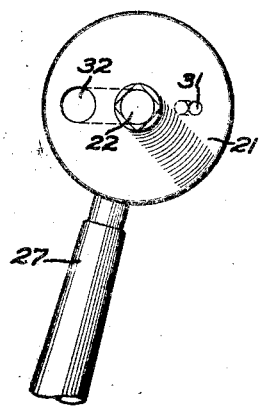
Figure 4 is a plan view of the face of the valve, the direction of the view being indicated by the arrow 4 of Figure 2.

The faucet of my invention comprises a head 2 having a threaded nipple 3, to adapt the head for connection to a water pipe 4, which preferably extends thru the panel 6 and is surrounded by the usual flange 7. A water passage 8 extends thru the nipple and terminates in a port 9 on the horizontal valve seat 11, formed on the under side of the head and surrounded by the flange 12.

The head is also formed with a second and larger syrup passage 13, which also opens on the valve seat 11 in the port 14, and on the top of the head, is in communication with the socket or cup 16, adapted to support and receive the regulated quantities of syrup from the receptacle 17 in the well known manner. There is thus provided thru the head, an unobstructed passage 8 for water and an unobstructed passage 13 for the syrup from the container 17.

Rotatably mounted on the valve seat is the valve 21, having a stem 22 extending upwardly thru the head and secured at the top by the nut 23. A washer 24 having apertures therein alined with the ports 9 and 14. is preferably interposed between the valve and its seat, and the pressure of the valve on the seat is regulated by the nut 23 seating against the washer 26 mounted on the squared end of the valve stem 22. Since the washer turns with the valve stem, movement of the latter does not tend to loosen the nut 23. A handle 27 provides means for turning the valve, and movement of the valve is limited by engagement of the handle with the ends 28 of a recess formed in the flange 12, which permits a movement of the valve thru an arc of about 90 degrees.

The valve face in contact with the valve seat is also provided with ports 31 and 32, so placed that with the handle 27 in the "on" position they are in register with the ports 9 and 14 respectively, and such ports 9 and 14 are covered when the handle is in the "off" position. Ports 31 and 32 are the ends of passages 33 and 34 respectively, which extend thru the valve and open on the under side thereof. The nozzle 36 concentric with the valve, and adapted to discharge syrup from the passage 34 axially of the valve, is threaded into the bottom of the valve, and an annular splash cup 37, is disposed on the nozzle 36 in such position as to receive the water discharging from the passage 33.

Surrounding the inner nozzle 36 is an outer nozzle 38 threaded on the valve 21, and having a discharge orifice 39 in line with the inner nozzle. The lower portion of the outer nozzle, about the discharge aperture 39, is contracted; and the upper portion of the outer nozzle is relatively large so that a mixing chamber 41 is provided within the outer nozzle.

It will be observed that the syrup flowing thru the passage 13 comes from the cup 16 and is under the lightest of pressures, since there is but an inch or two of "head". The water flowing thru the passage 8, however, is under the normal pressure existing in a water distributing system and for this reason the passage 8 is considerably smaller than the passage 13. These passages are of course properly proportioned in accordance with the conditions.

When the valve is turned to aline the ports 31 and 9, and 32 and 14, syrup from the container 17 flows by gravity thru the passage 13 into the passage 34 and out of the inner nozzle 36. At the same time water under the normal distributing system pressure is jetted into the splash cup 37, which diffuses the jet into a spray, throwing it violently against the inner surface of the outer nozzle 38. It then runs downwardly and thoroughly mixes with the stream of syrup issuing from the nozzle 36, the mixture being delivered from the outer nozzle thru the aperture 39 into the dispensing glass.

I claim:—

1. A mixing faucet comprising a head having a valve seat and formed with passages opening on said valve seat for fluid to be mixed, a valve mounted to rotate on said valve seat and provided with ports adapted by rotation of the valve to register with said passages, an inner nozzle mounted on said valve and forming an unobstructed continuation of one of said ports, a splash cup on said inner nozzle forming an obstruction to flow from the other of said ports, and an outer nozzle mounted on said valve and surrounding said inner nozzle, said outer nozzle being constricted to form substantially a continuation of said inner nozzle.

2. A mixing faucet comprising a head having a valve seat and formed with passages opening on said valve seat for fluids to be mixed, a valve mounted to rotate on said valve seat and provided with ports adapted by rotation of the valve to register with said passages, an outer nozzle mounted on said valve and constricted to form a discharge aperture, an inner nozzle centrally mounted on said valve and forming an unobstructed continuation of one of said ports and terminating in the upper portion of said outer nozzle, and a splash cup on said inner nozzle and forming an obstruction for the other of said ports whereby fluid issuing therefrom is diffused and directed onto the wall of the outer nozzle.

3. A mixing faucet comprising a head having a central bore therein and a valve seat perpendicular to the axis of said bore, a valve cooperating with said valve seat and having ports adapted to register with passages in said head upon rotation of said valve, a stem on said valve journaled within said bore, an inner nozzle attached to said valve and forming a continuation of one of said ports, an annular splash cup on said inner nozzle adapted to form a baffle for material flowing thru another of said ports, and an outer nozzle adapted to rotate with said valve, said outer nozzle having an enlarged portion enclosing said inner nozzle and a restricted outlet below said inner nozzle.

In testimony whereof, I have hereunto set my hand.

WILLIAM A. ENGLAND.